US009859719B2

United States Patent
Vuori et al.

(10) Patent No.: US 9,859,719 B2
(45) Date of Patent: Jan. 2, 2018

(54) METHOD AND APPARATUS FOR WIRELESS POWER TRANSFER

(71) Applicant: Nokia Technologies Oy, Espoo (FI)

(72) Inventors: Petri Vuori, Salo (FI); Juhani Kari, Lieto (FI); Jari Muurinen, Perniö (FI)

(73) Assignee: Nokia Technologies Oy, Espoo (FI)

(*) Notice: Subject to any disclaimer, the term of this patent is extended or adjusted under 35 U.S.C. 154(b) by 256 days.

(21) Appl. No.: 14/897,838

(22) PCT Filed: Jun. 17, 2013

(86) PCT No.: PCT/FI2013/050657
§ 371 (c)(1),
(2) Date: Dec. 11, 2015

(87) PCT Pub. No.: WO2014/202818
PCT Pub. Date: Dec. 24, 2014

(65) Prior Publication Data
US 2016/0126752 A1    May 5, 2016

(51) Int. Cl.
*H02J 5/00* (2016.01)
*H02J 7/02* (2016.01)
*H02J 17/00* (2006.01)
*H02J 7/04* (2006.01)

(52) U.S. Cl.
CPC ............. *H02J 5/005* (2013.01); *H02J 7/025* (2013.01); *H02J 7/04* (2013.01); *H02J 17/00* (2013.01)

(58) Field of Classification Search
CPC ............... H02J 7/025; H02J 17/00; H02J 7/04
See application file for complete search history.

(56) References Cited

U.S. PATENT DOCUMENTS

2008/0061733 A1    3/2008    Toya

FOREIGN PATENT DOCUMENTS

| WO | 2010028092 | 3/2010 |
|---|---|---|
| WO | 2013015206 | 1/2013 |

OTHER PUBLICATIONS

International Search Report and Written Opinion received for corresponding Patent Cooperation Treaty Application No. PCT/FI2013/050657, dated Mar. 20, 2014, 12 pages.

*Primary Examiner* — Robert Deberadinis
(74) *Attorney, Agent, or Firm* — Nokia Technologies Oy

(57) ABSTRACT

In accordance with an example embodiment of the present invention, an apparatus (200) comprises a wireless power transmitter (241) connectable to a power supply interface (201) and to a battery (204); power supply detection circuitry (213) configured to determine whether the power supply interface (201) is capable of powering the wireless power transmitter (241); wireless power control circuitry (220) configured to, in response to determining that the power supply interface (201) is capable of powering the wireless power transmitter (241), enable power delivery from the power supply interface (201) to the wireless power transmitter (241).

20 Claims, 6 Drawing Sheets

METHOD AND APPARATUS FOR WIRELESS POWER TRANSFER

RELATED APPLICATION

This application was originally filed as PCT Application No. PCT/FI2013/050657 filed Jun. 17, 2013.

TECHNICAL FIELD

The present application relates generally to wireless power transfer systems wherein an electromagnetic field is used to transfer energy over the air.

BACKGROUND

Electromagnetic induction has been known for a long time and it has been used in many applications such as generators, electronic motors, and transformers. In electromagnetic induction a time-varying magnetic flux induces an electromotive force to a closed conductor loop. Vice versa, a time-varying current creates a varying magnetic flux. In transformers, this phenomenon is utilized to transfer energy wirelessly from circuit to another via inductively coupled coils. A primary coil transforms an alternating current into a varying magnetic flux, which is arranged to flow through the secondary coil. The varying magnetic flux then induces an alternating voltage over the secondary coil. The proportion of the input and output voltage can be adjusted by the number of turns in the primary and secondary coils.

Wireless power transfer is another application where electromagnetic induction is used to transfer energy over the air. A wireless power transfer system may for example comprise a pair of coils coupled to each other for transferring energy by means of electromagnetic induction. A wireless power transfer system may comprise a transmitter device with a primary coil, and a receiver device with a secondary coil. For example, the transmitter may be a wireless charger device with the primary coil inductively coupled to a secondary coil of the receiver device. The current in the charger device is transferred to the receiver device through the electromagnetically coupled primary and secondary coils. The induced current may be further processed in the receiver device, for example to charge a battery.

SUMMARY

Various aspects of examples of the invention are set out in the claims. According to a first aspect of the present invention, an apparatus is disclosed. The apparatus comprises a wireless power transmitter connectable to a power supply interface and to a battery; power supply detection circuitry configured to determine whether the power supply interface is capable of powering the wireless power transmitter; wireless power control circuitry configured to, in response to determining that the power supply interface is capable of powering the wireless power transmitter, enable power delivery from the power supply interface to the wireless power transmitter.

According to a second aspect of the present invention, a method is disclosed. The method may comprise determining whether a power supply interface is capable of powering a wireless power transmitter; and in response to determining that the power supply interface is capable of powering the wireless power transmitter, enabling power delivery from the power supply interface to the wireless power transmitter.

According to a third aspect of the present invention, a computer program is disclosed. The computer program may comprise code configured to determine whether a power supply interface is capable of powering a wireless power transmitter; and in response to determining that the power supply interface is capable of powering the wireless power transmitter, enable power delivery from the power supply interface to the wireless power transmitter.

According to a fourth aspect of the present invention, a computer-readable medium is disclosed. The computer-readable medium may be encoded with instructions that, when executed by a computer, perform: determining whether a power supply interface is capable of powering a wireless power transmitter; in response to determining that the power supply interface is capable of powering the wireless power transmitter, enabling power delivery from the power supply interface to the wireless power transmitter.

According to a fifth aspect of the invention an apparatus is disclosed. The apparatus may comprise means for transmitting wireless power connectable to power supply means and to energy storage means; means for determining whether the power supply means is capable of powering the means for transmitting wireless power; control means for enabling power delivery from the power supply means to the means for transmitting wireless power in response to determining that the power supply means is capable of powering the means for transmitting wireless power.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Figure 1:
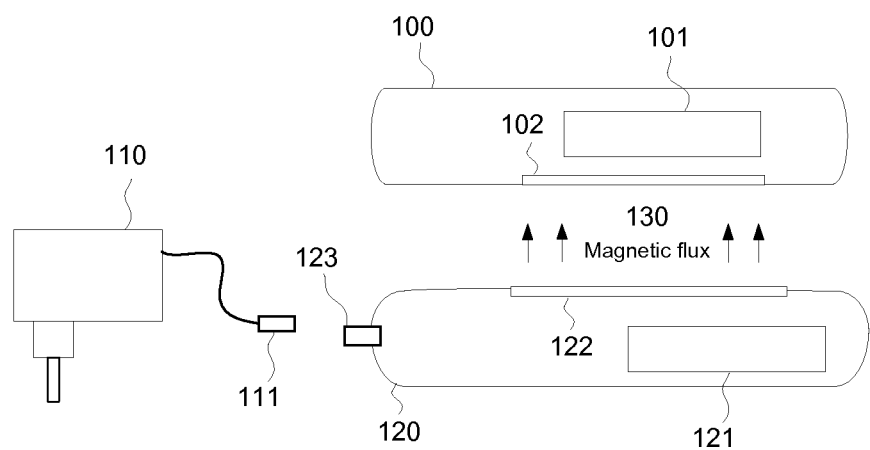
FIG. 1 illustrates an example of wireless power transfer principle.

In general, wireless power transfer systems include any means for transferring electrical energy in a contactless fashion. In an inductive power transfer system a transmitter is inductively coupled to at least one receiver and the transmitter transforms electrical energy from a power supply to a magnetic field towards the receiver. Depending on the characteristics of the devices, the inductively coupled devices may be configured to resonate at a resonance frequency to increase the extent of coupling, such as for example the magnetic flux from the transmitter to the receiver. Such inductive power transfer systems may be called resonance power transfer or resonance charging systems.

Inductive power transfer may be applied in a range of devices such as mobile phones, cameras, laptops, tablet computers, personal data assistants, PDA, music/video players and the like. The devices may include also other consumer appliances such as electric toothbrushes, torches, console controllers etc. The transmitter may draw the transferred energy from a power supply, for example. The power supply may be external, such as for example a mains cable, a wall charger, a USB charger, a spare battery with a wired power supply interface, or internal, such as for example a battery, solar panel, kinetic energy generator, fuel cell, power harvester or the like. The receiver device may comprise an energy storage, such as for example a battery or supercapacitor, or the receiver device may have the option to instantly consume the delivered energy without storing it for future use.

The wireless power transfer between a transmitter and a receiver may follow standardized procedures such as the Qi specification by Wireless Power Consortium, A4WP, Alliance for Wireless Power, or WPA, Wireless Power Alliance. The transmitter and receiver device may communicate with each other to negotiate parameters related to the power transfer according to a particular standard. Communication between the devices may be arranged by using the power transfer signal, that is, the signal conveying power between the transmitter and the receiver, or by another communication means such as Bluetooth, NFC, Near-Field Communication, or Wireless Local Area Network, IEEE 802.11. A communication interface between the wireless power transmitter device and wireless power receiver device may be also used to communicate other data than what is necessary for performing power transfer in accordance with a wireless power transfer standard. For example, the transmitter and receiver devices may exchange data related to the status of at least one of the devices, which may be taken into account when determining parameters to be used in the power transfer.

Some wireless power devices may include at least one wireless power transmitter and at least one wireless power receiver. Such devices may be called dual-mode wireless power transfer devices and they may be capable of operating both as a wireless power receiver and a wireless power transmitter. Dual-mode wireless power transfer devices may comprise means for determining the role of the device, that is, whether the device operates as a transmitter or a receiver of power. Some dual-mode wireless power transfer devices may even comprise a plurality of transmitters and/or receivers such that both roles can be supported at the same time. Dual-mode wireless power transfer devices may use the data received from the communication interface to another wireless power transfer device to determine the wireless power, WP, transfer mode, that is, whether the devices assumes a role of a power transmitter or a power receiver. Although embodiments of the invention may be described as related to wireless charging apparatuses, it should be appreciated that any type of wireless power transfer is in the scope of the invention. Also, the wireless power transfer devices described throughout the specification may or may not include dual-mode wireless power capability, that is, the embodiments of the invention may be applied in any suitable type of wireless power transfer devices, including transmitters with one or more transmitters, receivers with one or more receive units, and combinations thereof.

An example embodiment of the present invention and its potential advantages are understood by referring to FIGS. 1 through 6 of the drawings.

FIG. 1 illustrates an exemplary wireless charging system, where energy can be transferred through electromagnetic induction. Wireless power transmitter device 120, which may comprise, such as for example, a wireless charging, WLC, platform or a mobile phone with WLC transmitter capability, comprises inductive means 122 to transform electrical energy to a time-varying magnetic flux 130. The inductive means 122 may comprise, for example, a coil of electrically conductive material. The wireless power transmitter device 120 may be powered by at least one of power supply interface 123 and energy storage means 121. The energy storage means may comprise at least one battery, for example, wherein the at least one battery may be rechargeable. The power supply interface 123 may be connectable to a plug 111 of an external power supply 110. Power supply interface 123 may be generally considered to be an example of power supply means, wherein power supply means may include and support at least one of many possible types of power supply systems. For example, external power supply 110 may be a direct current, DC, power supply connectable to mains power or to another device. External power supply 110 may be, for example, a wall charger with dedicated charger plug or alternatively a universal serial bus, USB, plug. External power supply 110 may comprise a USB cable connectable to another device capable of providing power over the USB interface. Power supply interface 123 may comprise a plurality of connectors adapted to receive one or more external power supplies.

The wireless power transmitter device 120 may comprise any internal circuitry, one or more processors and one or more memories, that may be used to control operations performed in the wireless power transmitter device 120. For example, the electric current available from the power supply interface 123 may be arranged to flow through the inductive means 122, which may cause the magnetic flux 130 to appear. The wireless power transmitter device 120 may comprise means for modifying a received DC current from the power supply interface 123 or the energy storing means 121 to supply the inductive means 122 with an alternating current, AC. An AC current causes the magnet flux 130 to be time-variant and thus capable of inducing an electromotive force in a conductor. Means for modifying the DC current to supply the inductive means 122 with an alternating current may comprise, for example, an inverter, such as for example a square wave inverter or a sine wave inverter.

The wireless power receiver device 100, such as for example a mobile phone or other portable device, comprises inductive means 102 arranged to transform the magnetic flux 130 into an electric current. Inductive means 102 may comprise, for example, a coil of electrically conductive material. The wireless power receiver device 100 may comprise any internal circuitry, one or more processors and one or more memories, which may be used to control the operation of the wireless power receiver device 100. For example, the wireless power receiver device 100 may include an AC-to-DC converter for converting an alternating current to a direct current. The charged device may include energy storage means 121 such as for example a battery, for storing the electric energy captured by the inductive means 102.

Each of the inductive means 102, 122 may be implemented as at least one coil or a combination of at least one coil and analog components such as capacitors to enable the inductive means 102, 122 to resonate at a resonance frequency. The inductive means 122 at the transmitting side may be called a primary coil and the inductive means 102 at the receiver side may be called a secondary coil. In general, inductive means 102, 122 may include any kind of elements that enable inductive coupling between wireless power transmitter device 120 and receiver 102, that is, are capable of creating interdependence between a current and a magnetic flux.

Figure 2:
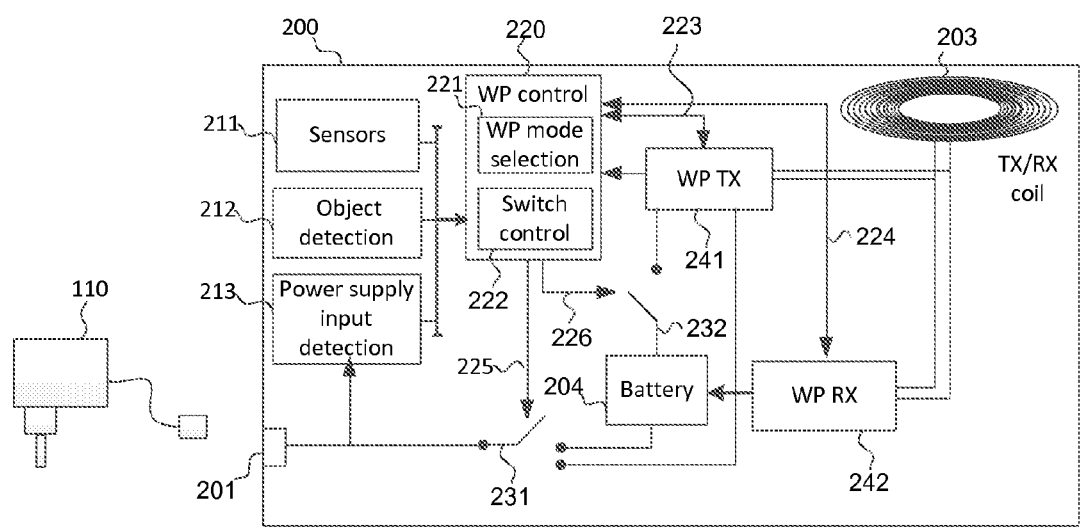
FIG. 2 illustrates an example of a wireless power transfer apparatus.

FIG. 2 presents an exemplary block diagram of a wireless power transfer device 200. Device 200 may be configured to operate as a power transmitter, a power receiver, both a power transmitter and a power receiver, or neither of them. Device 200 may for example represent more detailed structure of devices 100, 120 of FIG. 1. Some components illustrated in FIG. 2 may not be present in all embodiments of the invention and device 200 may also comprise components not shown in FIG. 2. For example, connections from components to each other may be implemented via other components that may or may not be shown in FIG. 2.

Device 200 may comprise one or more transmitter or receiver coils 203 to transform electrical energy to magnetic field or a magnetic field to electrical energy, as described elsewhere in this document. Coil 203 may be connected to a wireless power receiver 242, which may be configured to control the reception of wireless power through coil 203. Wireless power receiver 242, which is labeled "WP RX" in FIG. 2, may be for example implemented as an integrated circuit comprising a power input for receiving a power signal from coil 203, a demodulator to extract digital information from the received power signal, a modulator to communicate digital information through coil 203 to a wireless power transmitter device, or a power output to deliver power to the components of wireless power transfer device, for example to battery 204.

Wireless power receiver 242 may support wireless power reception according to one or more standards. Wireless power receiver 242 may be capable of determining the type of a received power signal, such as for example a standard of the wireless power signal. Wireless power receiver 242 may comprise a control interface for communicating with other functions of device 200 or external devices such as a wireless power transmitter device. For example, wireless power receiver 242 may be connected to a wireless power control block 220 of device 200. Wireless control block 220 may comprise power control circuitry to implement power control operations described throughout this document. The control interface of the wireless power receiver 242 may be configured to receive a control signal 224, such as for example an enable or disable signal causing the wireless power receiver 242 to enable or disable receiving power to its power input interface or delivering power via its power output interface. The control signal may also comprise other parameters or it may be transmitted by the wireless power receiver 242. Wireless power receiver 242 may include in the control signal 224 status information, which may be used in other functions of the device, for example, to determine wireless power transfer parameters. Such control information may for example include signal strength, frequency, standard or other parameters related to the received wireless power signal.

Wireless power receiver 242 may be operably connected to at least one battery 204, or more generally to any kind of energy storage means. Battery 204 may be capable of receiving a charging current via a power input interface and outputting a discharge current to provide power to other components of device 200. Battery may also include a control interface, not shown, to communicate with other entities in device 200.

Device 200 may comprise a wireless power transmitter 241, labeled as "WP TX" in FIG. 2, which may be connected to the one or more receiver or transmitter coils 203. Wireless power transmitter 241 may be configured to control the transmission of wireless power through coil 203. Wireless power transmitter 241 may be for example implemented as an integrated circuit comprising at least one power input for receiving a power signal from battery 204 or power supply 201, a modulator to modulate digital information to the power signal transmitted through coil 203 to a wireless power receiver device, a demodulator to sense variations in the power drawn by the power receiver device to demodulate digital information, a processor for processing the demodulated information, and/or a power output to deliver power to the coil 203. Wireless power transmitter 241 or another element comprised in device 200 may comprise a detector to detect whether an object is placed near coil 203.

Wireless power transmitter 241 may support wireless power transmission according to one or more standards. Wireless power transmitter 241 may be capable of determining the type of a wireless power receiver device, such as for example a standard supported by a wireless power receiver device. Determining whether a wireless power receiver device supports a particular standard may be done by applying a wireless power signal according to a standard and listening for a response from a wireless power receiver device. A response from the wireless power receiver device may be detected by sensing differences in power drawn by the receiver and demodulating digital information form these differences, for example.

Wireless power transmitter 241 may comprise a control interface for communication to other functions of device 200 or external devices such as a wireless power receiver device. For example, wireless power transmitter 241 may be connected to a wireless power control block 220 of device 200. The control interface of the wireless power transmitter 241 may be configured to receive a control signal 223, such as for example an enable or disable signal causing the wireless power transmitter 241 to enable or disable receiving power to its power input interface or delivering power via its power output interface. The control signal may also comprise other parameters such as frequency or standard to be used by wireless power transmitter 241. Alternatively, the wireless power transmitter 241 may send the control signal 223 and include in the control signal 223 status information, which may be used in other functions of the device to determine wireless power transfer parameters. Such control information may include charging parameters received from a wireless power receiver device, such as for example requested power signal strength, device identification, frequency or other parameters related to the power transfer between device 200 and a wireless power receiver device.

A wireless power control 220 may control power transfer operations in device 200 and it may be connected to various functions in device 200 to transmit and receive information. Transmitted or received information may comprise information related to wireless power transfer operations and/or status of the device. Wireless power control 220 may be implemented as a separate logical or physical entity. For example, it may be implemented as a computer program lying at the memory of device 200 and being operable by at least one processor or processing core of device 200.

In particular, wireless power control 220 may be connected to the wireless power transmitter 241 and wireless power receiver 242, for example to exchange control signals 223, 224. Wireless power control 220 may be also connected to functions that produce information for the purposes of wireless power control, such as one or more sensors 211, object detection 212, and/or power supply input detection 213. Communicating with these functions may comprise wireless power control 220 transmitting control signals, such as for example requests for information or enable/disable signals, and receive data produced or gathered by these functions. Wireless power control 220 may be also connected to one or more switches, such as for example switches 231 and 232, to control the delivery of power to different functions in device 200.

Device 200 may comprise a power supply interference 201 that may be connectable to a power supply. Power supply interface 201 may take several different forms, for example, similar to power supply interface 123 as discussed in connection with FIG. 1. Connected with power supply interface 201 there may be a power supply detection function 213 that may be configured to determine whether a power supply, for example power supply 110, is connected and/or whether it is capable of powering the wireless power transmitter, that is, providing sufficient amount of power to power supply interface 201. Power supply input detection 213 may comprise power supply detection circuitry to implement power supply detection as described throughout this document. Power supply detection 213 may be accomplished by tracking a voltage at the power supply interface 201, or by other electrical arrangement such as passive or active communication methods such as resistive or capacitive pull-ups or pull-downs, diode arrangements, digital communication, short circuit detection, or mechanical, optical or other means for power supply detection. Detection of power supply capabilities may be carried out to ensure that power supply 110 has sufficient capabilities to deliver power for the wireless power transmitter 241, for example, or to device 200 in general. Determining whether power supply 110 has sufficient power supply capability may for example comprise a load test or communication to and from power supply 110. A load test may comprise connecting a load to the power supply interface 201 and monitoring a voltage or a current at the power supply interface.

Object detection function 212 may be configured to detect objects in the proximity of coil 203. Object detection function 212 may comprise object detection circuitry to implement object detection as described throughout this document. Being in proximity of coil 203 may be in this context understood as being inside a maximum distance at which the coil 203 is still capable of inductively coupling to a coil of another wireless power transfer device. Such distance may vary from a few millimeters to tens of centimeters, or even more, depending on characteristics of the particular power transfer system. Hence, object detection function 212 may be capable of sensing an object on the so called interface surface area located in the proximity of the WP TX/RX coil 203. Object detection may be performed by low power operations such as resonance detection, capacitive sensing and the like. Object detection function 212 may comprise different stages; for example, 1) detecting an object making contact with device 200 with an acceleration sensor comprised in device 200, 2) detecting detuning of at least one antenna, such as for example a cellular antenna, to confirm object presence, and/or 3) transmitting a test sequence of magnetic field to detect inductive loading due to presence of a magnetic receiver. Object detection 212 is in FIG. 2 illustrated as a separate entity but this may be seen as a logical illustration and in practice object detection may take different forms of implementation. For example, object detection 212 may be implemented in connection with wireless power transmitter 241, or as separate circuitry connected with coil 203.

In some embodiments, one or more sensors 211 may be used for providing input data for the wireless power control 220. Measuring a quantity related to a particular sensor may be in response to receiving a corresponding request from the wireless power control 220. For example, an orientation sensor may measure spatial orientation of the device and report results of such measurements to wireless control 220. Reporting the orientation may include reporting the raw orientation data, for example detected pitch, roll and azimuth angles of the sensor, or alternatively the orientation sensor may be configured to report detecting that the device orientation fulfills at least one predetermined condition.

Sensors 211 may comprise at least one of an acceleration sensor that may provide information about stationarity, an ambient light sensor that may provide information about shadowing, and a capacitive touch sensor that may provide information about an even flat surface underneath. Such information may be used in wireless power control 220 to define the role of the device, to select/adjust wireless power transfer parameters, or to provide the information to different functions in device 200.

The wireless power control 220 may comprise physical or logical entities for performing different tasks. For example, a wireless power mode selection function 221 may comprise algorithms to process data received from other functions of device 200 and to control wireless power transfer operations based on the received data. The wireless power control 220 may further comprise a switch control function 222 to control one or more switches, such as for example switches 231 and 232, to control the delivery of power into different functions in device 200.

One of the tasks of a dual-mode WLC device may be to determine whether it acts as a wireless power transmitter device or a wireless power receiver device. This may be implemented in the wireless power mode selection 221 by processing data received from at least one of sensors 211, object detection 222, power supply input detection 213, wireless power transmitter 241, and/or wireless power receiver 242. Wireless power mode selection 221 may also receive data from data sources external to device 200, for example by wired or wireless connections to other wireless power transfer devices or to accessories of the device 200. Based on this information, the wireless power mode selection 221 may send a control signal 223 to wireless power transmitter 241, for example to cause the wireless power transmitter 241 to be transitioned to an enabled state or to a disabled state. Similarly, the wireless power mode selection 221 may send a control signal 224 to wireless power receiver 242, for example to cause the wireless power receiver 242 to be transitioned to an enabled state or to a disabled state.

Wireless power control 220 may comprise a switch control function 222 to control one or more switches in device 200. Switch control 222 may be configured to control delivery of the power inside device 200 by sending control signals 225, 226 to switches 231, 232, respectively. Switch 231 may be arranged to enable or disable power delivery from power supply interface 201 to battery 204. Switch 231 may be also arranged to enable or disable power delivery from battery 204 to wireless power transmitter 241. Wireless power control 220 may control power delivery inside device 200 in accordance with data received from one or more information sources, such as sensors 211, object detection 212, power supply input detection 213, wireless power transmitter 241, wireless power receiver 242, and/or at least one external information source. Switch control 232 may provide control signals 225, 226 to implement a desired power delivery configuration. Switch control 222 may comprise switch control circuitry to implement switch control operations as described throughout this document.

For example, if a power supply is connected to the power supply interface 201, the power control 220 may enable switch 231 to provide power directly to the wireless power transmitter 241. This configuration has the benefit of preventing unnecessary battery drain when device 200 is operating as a wireless power transmitter device. Also, when direct power delivery to wireless power transmitter 241 is enabled, device 200 may be used to transmit wireless power even if there is no battery in device 200 or the battery is damaged. Further, if switch 231 enables power delivery to both battery 204 and wireless power transmitter 241, the device may charge battery 204 while transmitting wireless power via the wireless power transmitter 241.

If a suitable power supply is connected to power supply interface 201, switch 232 may be controlled to disable power delivery from the battery 204 to the wireless power transmitter 241 to prevent wireless power transmitter 241 from consuming energy stored in battery 204, when connected to a power supply. If no suitable power supply is connected to power supply interface 201, switch 232 may be controlled to enable power delivery from the battery 204 to the wireless power transmitter 241 to enable wireless power transmission when no power supply is connected.

The exemplary structural elements of FIG. 2 may be generally seen as means for performing one or more functions. For example, wireless power transmitter 241 may be seen as an example of means for transmitting wireless power, wireless power receiver 242 may be seen as an example of means for receiving wireless power, power supply interface 201 may be seen as an example of power supply means, power supply input detection 213 may be seen as an example of means for detecting a power supply or means for determining whether the power supply means is capable of powering the means for transmitting wireless power, object detection 212 may be seen as an example of means for detecting an object or means for determining whether an object is in the proximity of a wireless power interface surface of the device, one or more sensors 211 may be seen as an example of means for detecting orientation, wireless power control 220 may be seen as an example of control means, wireless power mode selection 221 may be seen as an example of mode selection means, switch control 222 may be seen as an example of switch control means, battery 204 may be seen as an example of energy storage means, coil 203 may be seen as an example of inductive means, and/or switches 231, 232 may be seen as examples of switching means. Elements may be configured to perform functions described elsewhere in this document.

Figure 3A:
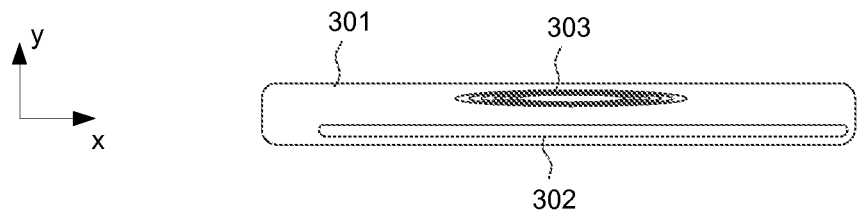
FIG. 3 illustrates exemplary orientations of a wireless power transfer apparatus.
Figure 3B:
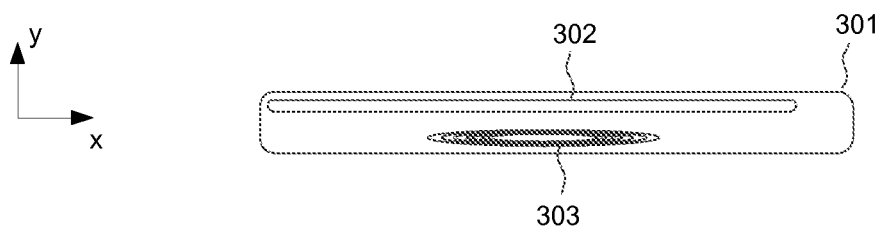
Figure 3C:
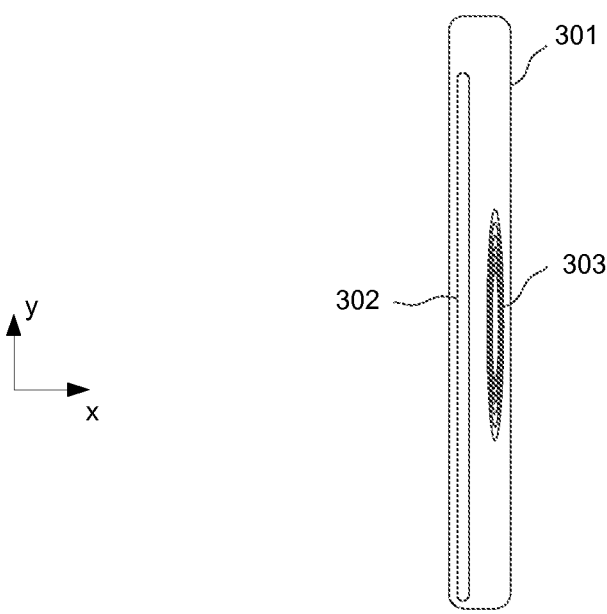

FIG. 3 illustrates three examples of predetermined orientations of a wireless power transfer device 301 suitable for wireless power transfer. Predetermined conditions or orientations may be characterized for example by the locations of display 302 and coil 303 with respect to horizontal x-axis and vertical y-axis. FIG. 3a refers to a condition labeled as UpsideDown, where the coil 303 may be located upper in the vertical direction y than the display 302. FIG. 3b refers to a condition labeled as DisplayUp, where the display 302 may be located upper in the vertical direction y than the coil 301. FIG. 3b refers to yet another predefined orientation labeled as Tilted90°, where the body of the phone may be tilted 90° with respect to horizontal axis x. In this case coil 303 may be located farther in the horizontal direction x than the coil 301, or vice versa. Various other predefined orientations suitable for wireless power transfer, either transmitting or receiving, may be defined based on locations of different components in device 301. For example, in case of a device with multiple coils 301 a plurality of orientations may be mapped to single predefined orientation if they provide similar functionality with respect to wireless power transfer. Orientations may be also defined based on the direction of coil 303 only.

Figure 4:
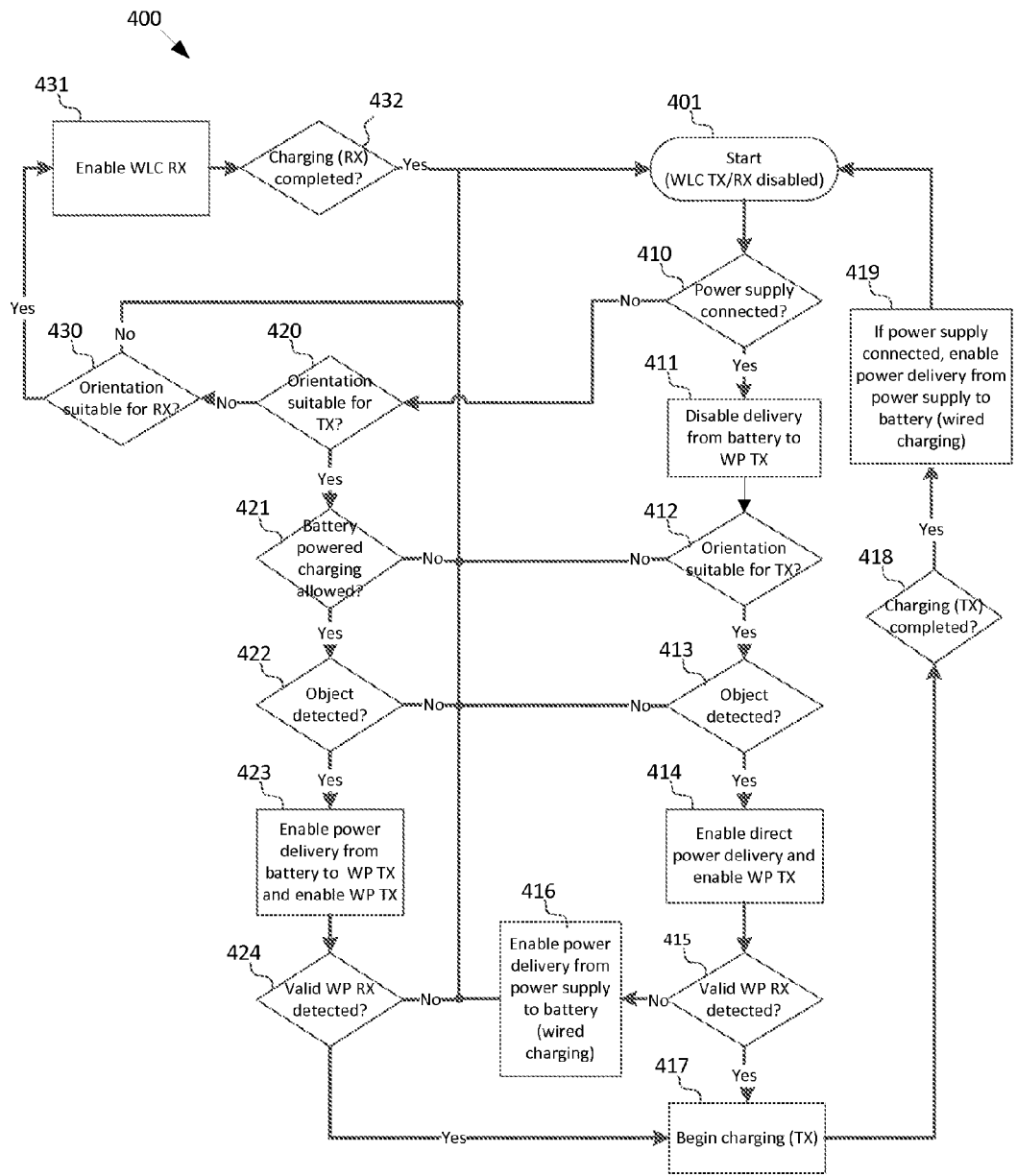
FIG. 4 presents a flow chart describing methods performed in a wireless power transfer apparatus, according to example embodiments of the invention.

FIG. 4 presents an exemplary method for controlling power delivery in device 200, in accordance with an example embodiment of the invention. Implementation of the corresponding flow chart may be done partly by the wireless power mode selection function 221 and switch control function 222, for example, as well as other functions of the system illustrated in FIG. 2. The embodiment of FIG. 4 assumes that object detection may be performed without connecting power to the wireless power transmitter 241.

The procedure may start at block 401 where the wireless power transmitter 241 may be in a disabled state. If wireless power transmitter 241 is not in a disabled state, such as for example in a sleep mode, the procedure may cause the wireless power transmitter 241 to be transitioned to a disabled state. Similarly, the wireless power receiver 242 may be in a disabled state. If wireless power receiver 242 is not in a disabled state, such as for example, in a sleep mode, the procedure may cause the wireless power receiver 242 to be transitioned to a disabled state.

The procedure may next move to block 410, wherein information received from power supply input detection 213, for example, may be used to determine if a power supply is connected to power supply interface 201 of device 200. Block 410 may also determine whether a power supply connected to the power supply interface 201 has sufficient power delivery capability. If power supply input detection has determined that the power supply is not connected or a power supply connected to power supply interface 201 does not have sufficient capabilities, it may report to power control 220 that no power supply is connected to the power supply interface 201. Alternatively, the power supply input detection 213 may report the characteristics of the power supply connected to power supply interface 201 to power control 220 to enable further processing of the power supply capabilities in power control 220. If it is determined that no suitable power supply is connected, the procedure may move to block 420.

If block 410 determines that a suitable power supply is connected to power supply interface 201, the switch control 222 may cause switch 232 to disable power delivery from battery 204 to wireless power transmitter 241 in block 411. Next, the procedure may move to block 412 for assessing the sensor data received from sensors 211. In particular, in block 412 one of the predefined orientations may be received or compared to raw orientation data. Block 412 may determine whether the orientation of the device is suitable for wireless power transmission. Examples of suitable orientations for transmitting include UpsideDown and Tilted90° illustrated in FIG. 3bc. If orientation is determined not to be suitable for wireless power transmission, the procedure may move back to start 401.

If orientation, or at least one predefined condition for other sensor data, is determined to be suitable for wireless power transmission, the procedure may move to block 413 for determining whether an object is located in the proximity of coil 203. If no object determined to be in proximity of coil 203, the procedure may move back to start 401. In an alternative embodiment, object detection 413 may be performed in the beginning of the procedure, for example before determining whether a power supply is connected. Such arrangement may help to preserve time and power since the procedure does not need to perform blocks 410, 411, and 412 if there is no object nearby.

If an object is detected, the procedure may move to block 414 to enable power delivery from power supply interface 201 to wireless power transmitter 241. Switch control 222 may enable switch 231 to deliver power directly from power supply interface 201 to wireless power transmitter 241. In response to detecting an object, power control 220 may send an enable signal 223, for example by causing the line between wireless power control 220 and wireless power transmitter 241 to be in an enable state. In response to the enable signal, wireless power transmitter 241 may detect whether the object is a valid wireless power receiver device, for example by determining whether the object operates according to a wireless power transfer standard.

If no valid wireless power receiver device is detected in block 415, the wireless power control 220 may enable power delivery from power supply interface 201 to battery 204 in block 416. The switch control 222 may cause switch 231 to enable power delivery from the power supply interface 201 to battery 204. Hence, the battery 204 may be charged even if a foreign object, for example, an object not capable of receiving wireless power, is located in the proximity of coil 203. A wireless power receiver device that is placed in the proximity of coil 203 and that does not need wireless power transfer may be treated as a foreign object for the purposes of switch control in device 200. For example, the procedure of FIG. 4 allows switch control 222 to enable power delivery to battery 204 when a detected wireless power receiver device has a full battery. After wired charging of battery 204 has begun in block 416, the procedure may move back to start 401.

If a valid wireless power receiver device is detected in block 415, the wireless power transmitter 241 may begin transmitting energy to the wireless power receiver device in block 417.

If block 410 determines that no suitable power supply is connected to power supply interface 201 or a power supply connected to power supply interface 201 does not have sufficient power delivery capabilities, the procedure may move to block 420 to determine whether orientation of device 200 is suitable for wireless power transmission. Functionality of block 420 may be similar to block 412. In response to determining that orientation is not suitable for wireless power transmission the procedure may move to block 430.

In response to determining that orientation is suitable for wireless power transmission the procedure may move to optional block 421, where the power control 220 may consider whether battery powered charging is allowed. Power control 220 may for example retrieve user preferences from the memory of the device, or, prompt a query to a user via a user interface. Determining whether battery powered charging is allowed may comprise determining a battery level of battery 204 or comparing the battery level to battery level of a nearby wireless power receiver device. Battery level information may be exchanged for example via one of the wireless communication interfaces of device 200. If battery powered charging is not allowed in block 421, the procedure may move back to start 401.

If battery powered charging is allowed in block 421, the procedure may move to block 422 to detect whether an object is located in the proximity of coil 203. Functionality of block 422 may similar to block 413. If no object is detected in block 422, the procedure may move back to start 401.

If an object is detected in block 422, the procedure may move to block 423 to enable power delivery from battery 204 to wireless power transmitter 241 and to enable wireless power transmitter 241. For example, switch control 222 may enable switch 232 to deliver power from battery 204 to wireless power transmitter 241. In response to detecting an object, enabling the wireless power transmitter 241 may be performed by sending an enable signal 223. In response to the enable signal, wireless power transmitter 241 may detect whether the object is a valid wireless power receiver device, for example by determining whether the object operates according to a wireless power transfer standard.

If no valid wireless power receiver device is detected in block 424, the procedure may move back to start 401. If a valid wireless power receiver device is detected in block 424, the wireless power transmitter 241 may begin transmitting energy to the wireless power receiver device in block 417.

During charging, that is, transmitting wireless power in this case, device 200 may determine whether charging is completed in block 418. The wireless power transmitter 241 may for example decode control messages received from the wireless power receiver device that is receiving the power. Device 200 may also repeat object detection to check whether the wireless power received is still located in the proximity of coil 203. If is it determined that charging has completed, the procedure may move to block 419, where the functionality may depend of whether a power supply was determined to be connected in block 410. Alternatively, block 419 may perform power supply input detection, for example to check whether a power supply has been connected or disconnected during execution of method 400. If a power supply is connected, power control 200 may enable power delivery from power supply interface 201 to battery 204 to initiate wired charging. Hence, battery 204 may be charged when a fully charged wireless power receiver device is not removed from the proximity of coil 203. Next, procedure may move back to start 401.

If it is determined in block 420 that orientation of device 200 is not suitable for wireless power transmission, the procedure may move to block 430 to determine whether the orientation is suitable for wireless power reception. It should be understood that more sophisticated algorithms for selecting whether device 200 is to operate as a wireless power transmitter device or a wireless power receiver device can be implemented based on available information, such as status of the device 200. Also, if it is determined that a particular orientation is not suitable for one wireless power transfer role such as, for example, a transmitter role, the device may directly assume another role, such as, for example, a receiver role. If it is determined that orientation of device 200 is not suitable for wireless power reception, the procedure may move back to start 401.

If it is determined that orientation of device 200 is suitable for wireless power reception, the procedure may move to block 431 to enable wireless power receiver 242. Enable signal 224 may be sent, such as for example by causing the line between wireless power control 220 and wireless power receiver device 242 to be in an enable state. In response to the enable signal, wireless power receiver device 242 may be configured to operate in accordance with a wireless power transfer standard, such as for example to respond to ping signals received at the wireless power receiver 242. During wireless power transfer, wireless power receiver 242 may receive wireless power via coil 203 and it may deliver the received power to battery 204. During charging, that is, receiving wireless power in this case of block 432, device 200 may determine in block 432 whether charging is completed, for example by monitoring battery level of battery 204. The wireless power receiver device 242 may encode control messages to be transmitted to the wireless power transmitter device providing wireless power signal to coil 203. Transmitting control messages may be done by modulating the load caused by the wireless power receiver device 242 in accordance with the encoded control message. If it is determined that charging has completed, the procedure may move back to start 401.

Figure 5:
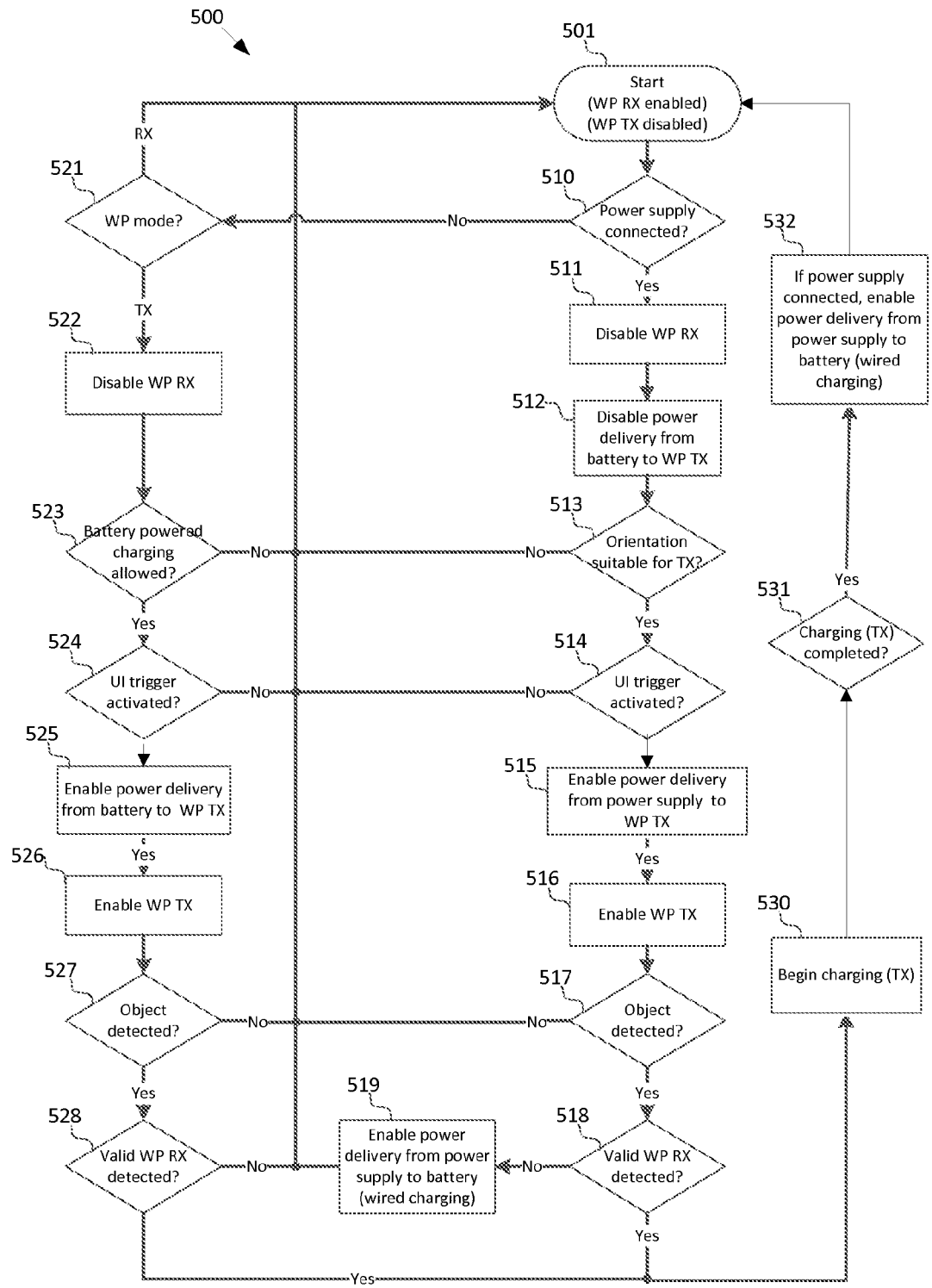
FIG. 5 presents a flow chart describing methods performed in a wireless power transfer apparatus, according example embodiments of the invention.

FIG. 5 presents an exemplary method 500 for controlling power delivery in device 200, for example, in accordance with at least some example embodiments of the invention. Implementation of the corresponding flow chart may be done partly by the wireless power mode selection function 221 and switch control function 222, for example, as well as other functions of the system illustrated in FIG. 2. The embodiments presented in FIG. 5 assume that the wireless power receiver device 242 is enabled by default. Also, it is assumed that object detection may be performed at least partly by the wireless power transmitter 241. It should be understood that embodiments presented in FIG. 4 and FIG. 5 may be combined by replacing, reordering, and removing blocks and that blocks presented in one figure may be used in another figure to create further embodiments that do not depart from the scope of the invention.

The procedure may start at block 501 where the wireless power transmitter 241 may be in a disabled state. If wireless power transmitter 241 is not in a disabled state, such as for example in a sleep mode, the procedure may cause the wireless power transmitter 241 to be transitioned to a disabled state. The wireless power receiver 242 may be in an enabled state. If wireless power receiver 242 is not in an enabled state, the procedure may cause the wireless power receiver 242 to be transitioned to an enabled state.

The procedure may next move to block 510, wherein information received from power supply input detection 213, for example, may be used to determine if a power supply is connected to power supply interface 201 of device 200 or if a connected power supply has sufficient power delivery capability. Block 510 may implement functionality similar to block 410 of FIG. 4.

In response to determining in block 510 that a suitable power supply is connected to power supply interface 201, the wireless power receiver device 242 may be transitioned to a disabled state. Device 200 may thus be able to preserve energy, since the wireless power receiver 242 may be shut down, when a power supply is connected to the device. If it is determined in block 510 that a suitable power supply is connected to power supply interface 201, the switch control 222 may cause switch 232 to disable power delivery from battery 204 to wireless power transmitter 241 in block 512. Disconnecting battery 204 from wireless power transmitter 241 prevents the wireless power transmitter 241 from drawing energy from battery 204 and thus prevents unnecessary discharge of battery 204. Next, the procedure may move to block 513 for assessing the sensor data received from sensors 211, such as for example an orientation sensor. Block 513 may operate in a similar fashion to block 412 of FIG. 4. If orientation is determined not to be suitable for wireless power transmission, the procedure may move to start 501.

If orientation of device 200 is found suitable for wireless power transmission, device 200 may determine in optional block 514 whether a user interface, UI, trigger is activated or not. For example, device 200 may request and receive user input to determine if it is allowed to transmit wireless power from device 200. User input may also comprise preferred or accepted wireless power transfer parameters, such as for example permissibility of power transmission, power signal strength, maximum duration of power transfer, required battery level to initiate or continue wireless power transfer, required authentication of the wireless power receiver device, or the like. An activated UI trigger may in general refer to fulfilling conditions, where user input data allows or requires to prepare for power transmission.

In response to detecting a UI trigger allowing power transmission in block 514, the procedure may move to block 515 to control power delivery in device 200. Switch control 222, for example, may cause switch 231 to enable power delivery from power supply interface 201 to wireless power transmitter 241. In response to detecting a UI trigger allowing power transmission in block 514, the procedure may also enable wireless power transmitter 241 in block 516.

Turning on the wireless power transmitter 241 may in some embodiments enable object detection in block 517. For example, object detection may be performed by supplying a current pulse from the wireless power transmitter 241 to coil 203. By studying the response to the current pulse, the wireless power transmitter 241 may determine whether an object is present or not. If no object is found, the procedure may move to back to start 501.

If block 517 determines that an object is in the proximity of coil 203, the wireless power transmitter 241 may detect whether the object comprises a valid wireless power receiver device. Functionality of block 518 may be similar to block 415. If no valid wireless power receiver device is detected in block 518, the power control 220 may initiate wired charging of battery 204 by enabling power delivery from power supply interface 201 to battery 204 in block 519, which may operate similar to block 416.

If it is determined in block 510 that no suitable power supply is connected to power supply interface, the procedure may move to block 521 to determine wireless power transfer mode, such as for example, role of the device during wireless power transfer. Determining a wireless power role may in general comprise determining whether the device should operate as a wireless power transmitter device, wireless power receiver device, both a wireless power transmitter device and a wireless power receiver device, or neither of them. In the example of FIG. 5, the wireless power control 220 determines whether device 200 should operate as a wireless power transmitter device, and a default mode for device 200 is to act as a wireless power receiver device. As discussed above, wireless power control 220 may receive information from a plurality of information sources to determine the role of the device.

Conditions that may cause power control 220 to determine device 200 to act as a wireless power transmitter device may include at least the following: detecting a power supply plug to be connected to power supply interface 201, determining a power supply to be capable of providing sufficient amount of power, detecting a suitable power supply plug type, detecting a connected power supply plug in a particular power supply interface of a plurality of power supply interfaces, detecting a predefined orientation of device 200, detecting a battery level of battery 204 to be above a threshold, detecting that a particular process is not performed in device 200, detecting that current power consumption of device 200 is below a threshold, or receiving an acceptable user identification from a wireless power receiver device, or a combination of at least two aforementioned conditions.

If it is determined in block 521 that the device should operate as a wireless power transmitter device, the procedure may move to block 522 to disable the wireless power receiver 242. Otherwise, the procedure may move back to start 501, since device 200 may operate as a wireless power receiver device by default.

In blocks 523, 524, 525, 526, 527 and 528 device 200 may determine whether battery powered charging, or power delivery in general, is allowed; determine whether a UI trigger is activated, enable power delivery from battery 204 to wireless power transmitter 241, enable wireless power transmitter 241, detect whether an object is in the proximity of coil 203, and detect whether an object is a valid wireless power receiver device, respectively. Functionality of blocks 523, 524, 525, 526, 527, and 528 may be similar to blocks 421, 514, 515, 516, 517, and 518, respectively.

If a valid wireless power receiver device is detected in either of blocks 518, 528, the wireless power transmitter 241 may begin to transmit wireless power, for example to charge a battery of a wireless power receiver device. Block 530 may operate similar to block 417.

In block 531, similar to block 418, device 200 may determine whether charging is completed and wired charging may be enabled in block 532 if power supply is connected, similarly to block 419.

Figure 6:
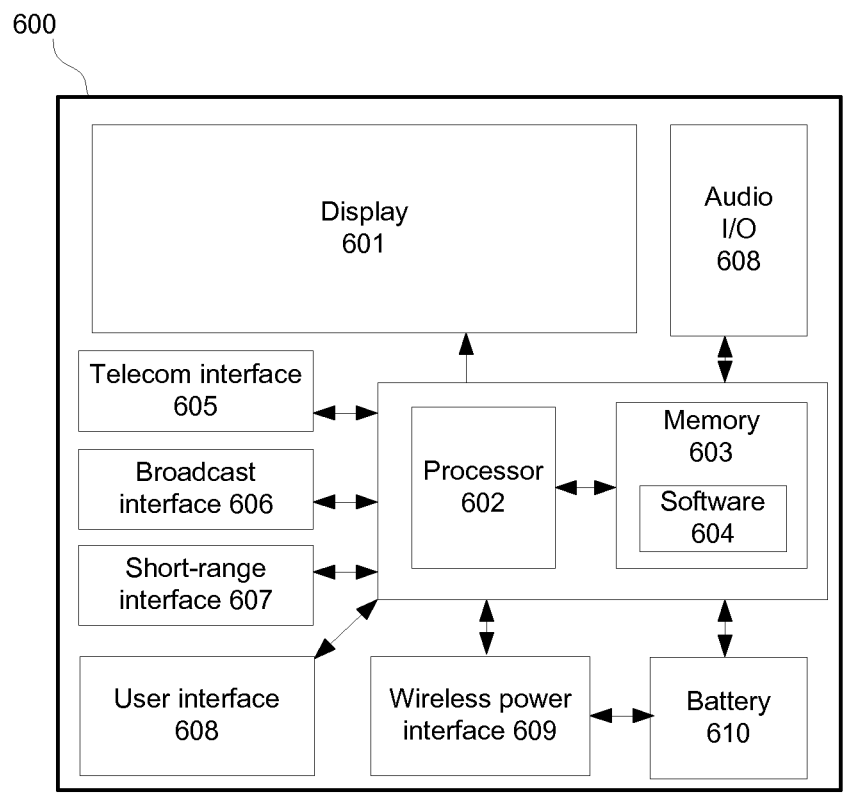
FIG. 6 illustrates an example of an apparatus implementing one or more embodiments of the invention.

FIG. 6 presents an exemplary apparatus where one or more embodiments presented herein may be implemented. Apparatus 600 may include at least one processor 602 in connection with at least one memory 603 or other computer readable media. Memory 603 may be any type of information storing media including random access memory (RAM), read-only memory, ROM, programmable readable memory, PROM, erasable programmable memory, EPROM, and the like, and it may contain software in form of computer executable instructions.

Apparatus 600 may also comprise one or more communication interfaces, for example telecom interface 605, such as for example a Global System for Mobile Communications, GSM, Wideband Code Division Multiple Access, WCDMA, or 3$^{rd}$ Generation Partnership Project-Long term Evolution, 3GPP LTE, cellular radio; a broadcast interface 606, such as for example Digital Video Broadcasting, DVB, Frequency Modulation, FM, Digital Audio Broadcasting, DAB, or Chinese Mobile Multimedia Broadcasting, CMMB, radio; or a short-range interface 607, such as for example a Bluetooth radio, a wireless local area network radio, WLAN, or a near field communication system, NFC. Apparatus 600 may further comprise a user interface 608, display 601, and audio input/output 608 for communicating with the user and a wireless power interface 609 for receiving and/or transmitting energy via electromagnetic induction. The apparatus may also comprise a battery capable of being charged and to deliver power for various operations performed in apparatus 600.

Without in any way limiting the scope, interpretation, or application of the claims appearing below, a technical effect of one or more of the example embodiments disclosed herein is improving power efficiency in a dual-mode wireless power transfer device. Another technical effect of one or more of the example embodiments disclosed herein is to avoid unnecessary wearing of a battery when a battery operated device is acting as a wireless power transmitter device. Yet another technical effect of one or more of the example embodiments disclosed herein is to provide a wireless power transfer device that can perform wireless power transmission even if the battery of the device would not be in place or would be damaged.

Embodiments of the present invention may be implemented in software, hardware, application logic or a combination of software, hardware and application logic. The software, application logic and/or hardware may reside on an energy transmitting device such as a wireless charging platform or an energy receiving device such as a mobile device to be charged. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a computer described and depicted in FIG. 6. A computer-readable medium may comprise a computer-readable storage medium that may be any non-transitory media or means that can contain or store the instructions for use by or in connection with an instruction execution system, apparatus, or device, such as a computer. Although some embodiments of the invention may be described as being implemented by structural elements, the scope of the invention should be understood to cover any means for achieving a particular result in accordance with the structural element in question. For instance, example embodiments of the invention may include means for processing, means for detecting, means for determining, means for sending, means for transmitting, means for receiving, means for enabling, means for disabling, means for providing, means for connecting, means for disconnecting, means for delivering power, means for charging battery, or the like.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
a wireless power receiver connectable to a battery;
a wireless power transmitter connectable to a power supply interface and to the battery;
power supply detection circuitry configured to determine whether the power supply interface is capable of powering the wireless power transmitter;
wireless power control circuitry configured to, in response to determining that the power supply interface is capable of powering the wireless power transmitter, enable power delivery from the power supply interface to the wireless power transmitter, and configured to disable the wireless power receiver in response to determining that the power supply interface is capable of powering the wireless power transmitter.

2. The apparatus of claim 1, wherein the wireless power control circuitry is further configured to disable power delivery from the battery to the wireless power transmitter, in response to said determining that the power supply interface is capable of powering the wireless power transmitter.

3. The apparatus of claim 1, wherein the wireless power control circuitry is configured to enable the wireless power transmitter in response to determining that the power supply interface is capable of powering the wireless power transmitter.

4. The apparatus of claim 3, wherein the wireless power control circuitry is configured to enable the wireless power transmitter in response to detecting at least one of a predetermined transmitter orientation, an object in the proximity of a wireless power interface surface of the apparatus, and a user input to accept at least one parameter of wireless power transmission.

5. The apparatus of claim 4, wherein the wireless power transmitter is configured to detect whether the object is capable of receiving wireless power, and wherein the power control circuitry is further configured to enable power delivery from the power supply interface to the battery, in response to determining that the object is not capable of receiving wireless power.

6. The apparatus of claim 1, wherein the wireless power transmitter and wireless power receiver are operably connected to, or comprised in, a wireless power transceiver coil.

7. The apparatus of claim 1, wherein determining whether the power supply interface is capable of powering the wireless power transmitter comprises detecting whether a power supply is connected to the power supply interface or whether a power supply connected to the power supply interface is of a predetermined type.

8. The apparatus of claim 1, wherein determining whether the power supply is capable of powering the wireless power transmitter comprises detecting a current or a voltage at the power supply interface.

9. A method, comprising:
determining whether a power supply interface is capable of powering a wireless power transmitter;
in response to determining that the power supply interface is capable of powering the wireless power transmitter, enabling power delivery from the power supply interface to the wireless power transmitter and disabling a wireless power receiver.

10. The method of claim 9, further comprising:
in response to determining that the power supply interface is capable of powering the wireless power transmitter, disabling power delivery from the battery to the wireless power transmitter.

11. The method of claim 10, further comprising:
in response to determining that the power supply interface is capable of powering the wireless power transmitter, enabling the wireless power transmitter.

12. The method of claim 11, wherein enabling the wireless power transmitter is in response to detecting at least one of a predetermined transmitter orientation, an object in the proximity of a wireless power interface surface of the apparatus, or a user input to accept at least one parameter of wireless power transmission.

13. The method of claim 12, further comprising:
detecting whether the object is capable of receiving wireless power; and
in response to determining that the object is not capable of receiving wireless power, enabling power delivery from the power supply interface to the battery.

14. The method of claim 9, wherein the wireless power transmitter and wireless power receiver are connected to a wireless power transceiver coil.

15. The method of claim 9, wherein determining whether the power supply interface is capable of powering the wireless power transmitter comprises detecting whether a power supply is connected to the power supply interface or whether a power supply connected to the power supply interface is of a predetermined type.

16. The method claim 9, wherein determining whether the power supply is capable of powering the wireless power transmitter comprises detecting a current or a voltage at the power supply interface.

17. A computer program, comprising:
code configured to determine whether a power supply interface is capable of powering a wireless power transmitter; and
in response to determining that the power supply interface is capable of powering the wireless power transmitter, enable power delivery from the power supply interface to the wireless power transmitter and disable a wireless power receiver.

18. The computer program of claim 17, further comprising:
code configured to disable power delivery from the battery to the wireless power transmitter in response to determining that the power supply interface is capable of powering the wireless power transmitter.

19. The computer program of claim 17, further comprising:
code configured to enable the wireless power transmitter in response to determining that the power supply interface is capable of powering the wireless power transmitter.

20. A computer-readable medium encoded with instructions that, when executed by a computer, perform:
determining whether a power supply interface is capable of powering a wireless power transmitter;
in response to determining that the power supply interface is capable of powering the wireless power transmitter, enabling power delivery from the power supply interface to the wireless power transmitter and disabling a wireless power receiver.

* * * * *